June 19, 1923.  
M. RESK  
AUTOMATIC LIFE PROTECTOR FOR AUTOMOBILES  
Filed Nov. 19, 1921
1,459,314
2 Sheets-Sheet 1
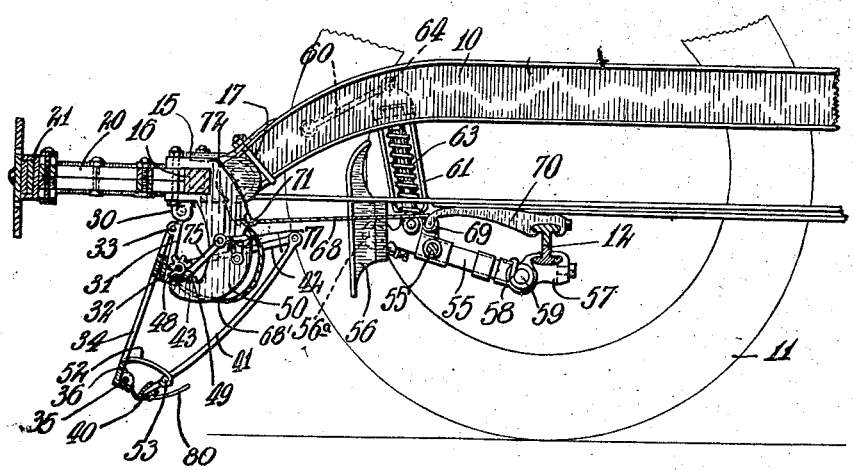
Fig.-1.
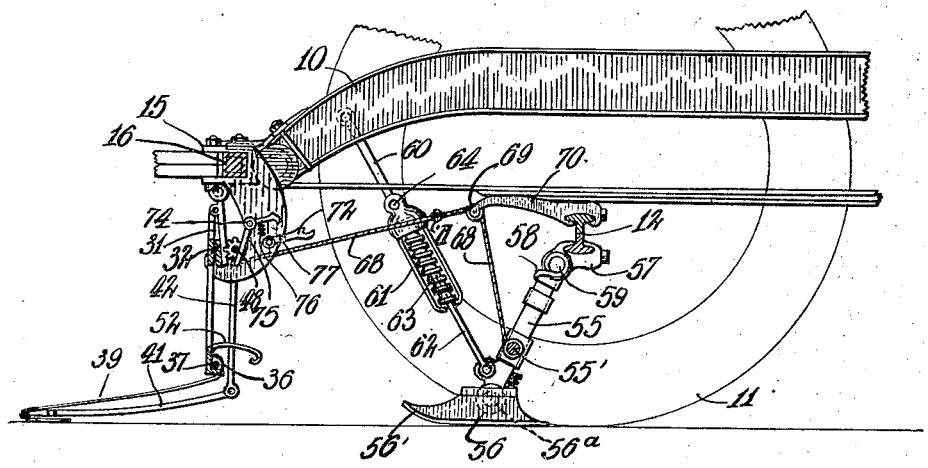
Fig.-2.
Inventor
Mickell Resk
Attorney

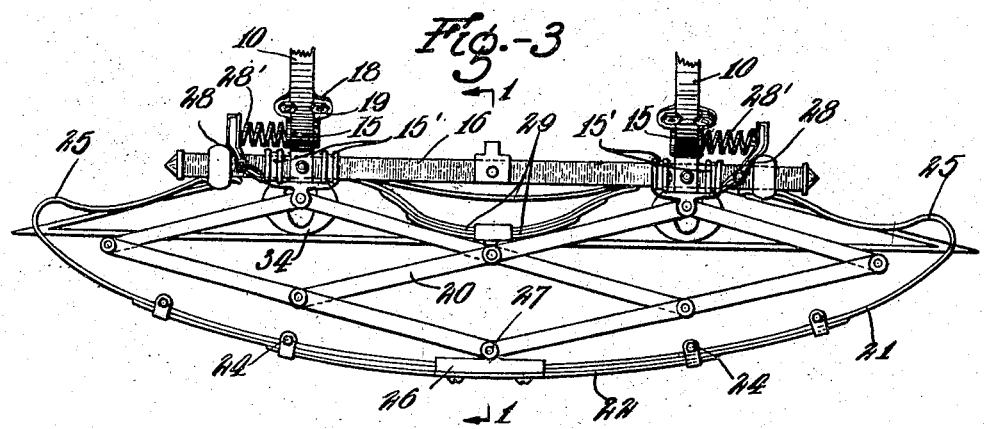

Patented June 19, 1923.

1,459,314

UNITED STATES PATENT OFFICE.

MICHELL RESK, OF NEW YORK, N. Y.

AUTOMATIC LIFE PROTECTOR FOR AUTOMOBILES.

Application filed November 19, 1921. Serial No. 516,383.

*To all whom it may concern:*

Be it known that I, MICHELL RESK, citizen of France, residing at New York, in the county of New York and State of New York, have invented certain new and useful Improvements in Automatic Life Protectors for Automobiles, of which the following is a specification.

This invention relates to safety devices for automobiles, having more particular reference to a combined fender, braking device and bumper, the present invention being an improvement on one shown in a previous application for patent filed by me on Aug. 1, 1921, under Serial No. 489,110.

The invention has for an object to provide a novel and improved combination fender brake, and bumper, in which the braking device is adapted to be operated automatically or manually, to bring the automobile to a rapid stop when an object is struck, while the fender is projected to operative position to pick up the victim.

For further comprehension of the invention, and of the objects and advantages thereof, references will be had to the following description and accompanying drawings, and to the appended claims in which the various novel features of the invention are more particularly set forth.

Fig. 1 of the drawings is a longitudinal sectional elevation showing my improved combination safety attachment in position on an automobile, this view being taken on the line 1—1 of Fig. 3, the various parts being shown in normal inoperative position.

Fig. 2 is a similar view to the Fig. 1, but showing the parts in operative position.

Fig. 3 is a plan view of the fender element of my improved attachment.

Fig. 4 is a front view thereof.

Fig. 5 is a detail fragmentary front elevation of the swingable frame on which the fender proper is suspended.

Fig. 6 is a fragmentary longitudinal vertical section, showing particularly the means for extending the fender apron.

In the drawings the reference numeral 10 designates the main longitudinal frame members of an automobile chassis, 11 indicating the front wheels, and 12 the front axles.

Fixed to the front ends of the members 10 are forked brackets 15 in the bifurcations of which a square crossbar 16 is fixed. On the latter are slidably held sleeves 15'.

These brackets may be fixed to the frame member 10 by means of U-bolts 17 straddling said frame members and projecting at their ends through apertured ears 18 on the brackets, nuts 19 being screwed on the ends of the U-bolts.

The sleeves 15 serve to support a horizontal toggle-link structure 20 on the front of which is mounted a resilient bumper bar 21. This bumper bar may be reinforced at the centre by supplementary strips 22 clamped thereto by clamps 24 and may have its ends turned inwardly as at 25 to connect to the crossbar 16. Upon the centre of the bumper bar 21 a channeled member 26 is mounted and has the toggle-link bumper structure connected thereto as at 27. The sleeves 15' are resiliently held against movement along the bar 16 by levers 28 fulcrumed between their ends on the bar 16 and having one end bearing on the sleeves 15' and the opposite ends engaging expansions springs 28' which have the brackets 15 for abutments. Interposed between the bumper structure 20 and the crossbar is a leaf spring member 29 which serves as a cushion to resist collapsing movement of the bumper structure.

Depending from the brackets 15 are integral lugs such as 30 to which are pivotally connected the upper ends of a pair of arms 31 rigidly connected together by a crossbar 32. These arms 31 have hinged thereto as at 33 a metallic fender element 34 which may comprise a skeleton frame of ornamental design as shown in Fig. 4. This fender element 34 forms the back portion of the complete fender and has a bottom horizontal bar 35 of angular shape in cross section and formed with a series of fillets 36 whereby a roller shaft 37 is rotatably supported on said bar, this shaft 37 having engaged therewith a coiled spring (not shown) which urges it in one direction after the well known manner of a curtain roller.

This roller shaft 37 has fixed thereto a number of closely spaced strips 39 of soft sheet material which collectively form a fender apron, the opposite ends of these strips being secured to a channeled foot-bar 40. This channeled foot-bar 40 is fixed on the corresponding ends of a pair of thrust arms 41 which are pivoted at their rear ends on the rear ends of a pair of oscillatory arms 42, the latter being fixed at their forward ends on a transverse shaft 43 journaled in brackets 44 mounted on the free ends of the arms 31 before mentioned, as best shown in Fig. 5.

When this shaft 43 is rotated the arms 41, 42 are caused to move from the position shown in Fig. 1 to that shown in Fig. 2, means being provided for causing such movement to take place when the fender back is struck by an object. As here shown this means comprises a gear 48 fixed to the shaft 43 and engaging rack teeth 49 formed on a member 50 depending rigidly from the crossbar 16, these rack teeth 49 being arranged concentric to the suspension axis of the arms 31. It will be noted that the fender back 34 is connected to the arms 31 relatively near the suepension point thereof so that the gear 48 receives an accelerated movement when the fender back is struck, resulting in a rapid swinging of the fender apron to operative position. To prevent any chance of the apron strips 39 unwinding because of vibration as the automobile travels, a pair of hooked fingers such as 52 project rearwardly from the fender back 34 and engage over pins such as 53 on the arms 41.

The braking device which acts in co-operation with the fender comprises a pair of arms such as 55 arranged one at each side of the automobile and each having a shoe 56 mounted on its forward end. These arms are hinged to clip-brackets such as 57 fixed to the front axle 12 and are normally urged downward by means of springs such as 58 coiled around their pivot pins 59 and bearing against the arms. These arms 55 are of such length as to have the roughened bottom surface of the shoes 56 rest on the ground when the arms are at a slight forward inclination as in Fig. 2, so that upon further forward movement due to the momentum of the automobile the arms will assume a substantially vertical position with the front end of the automobile raised and supported by the shoes 56, which latter have upturned forward ends 56'. The shoes 56 are preferably connected to the arms 55 by universal joints such as 56ᵃ to allow the shoe to ride over uneven surfaces. Rearward swinging movement of the arms 55 is arrested by means of a pair of jointed links connected thereto at one end and to the frame members 10 at their opposite ends. These links each comprise a short arm 60, and a long arm comprising an elongated cage 61 and a headed rod 62 telescopically engaged in said cage and urged thereinto by means a coiled expansion spring 63. The short arm 60 is pivoted to the cage as at 64, while the rod 62 is pivotally attached to the brake arm 55. The parts are preferably so arranged that rod 62 will reach the limit of its outward movement when the shoes 56 are directly under the axle 12.

To hold the shoes in raised position a cable 68 is attached to a shaft 55' extending rigidly between the arms 55 and passes upwardly around a pulley 69 mounted on a finger 70 projecting rigidly from the axle 12, and thence forwardly having a ring 71 attached thereto which is adapted to take over a hooked latch 72 pivoted on the bracket 50. This latch 72 is held in operative position by a detent arm 73 pivoted as at 74 to the bracket 50 and having a tail-piece 75 which projects in front of the shaft 43, a spring 76 holding the detent engaged with a pin 77 on the latch. To prevent the rope 68 falling and dragging when the latch is freed a slack portion 68' extends from the ring 71 to the crossbar 32. Fixed each at one end to the bar 40 are a number of spring fingers 80 which project rearwardly under the bar.

The manner of operation of my improved safety attachment is as follows: When the fender back 34 strikes an object, the arms 31 are swung back and the gear 48 caused to roll on the rack 49. The rolling movement of gear 48 gives a rotary movement to shaft 43 which swings the arms 42 downward and forward, these arms pushing the thrust arms 41 downward and forward, and since the arms 41 are connected to the strips 39, the latter are unrolled and the fender apron projected to the position shown in Fig. 2, the bar 40 being supported slightly above the ground by the spring fingers 80. As the arms 31 move backward the tail-piece 75 of detent 73 is engaged and the detent moved to disengage from the pin 77 and so free latch 72, from which the ring 71 on the rope 68 then disengages. The shoes 56 fall to the ground, and the momentum of the automobile causes the front end thereof to lightly rise, transferring its weight to the shoes. During this rising movement the springs 63 are expanded and when the automobile stops these springs move the automobile backward until the wheels 11 again rest on the ground. The automobile is thus brought to a very rapid stop while a person striking the automobile is picked up by the fender.

Having thus described my invention what I claim as new and desire to protect by Letters Patent of the United States is as follows:—

1. In an automobile, in combination, a fender having a hinged back portion and an extensible apron portion, and means acting automatically to extend said apron portion upon backward swinging movement of said back portion, said means including a rack, a gear adapted to be caused to roll on said rack upon rearward movement of said back portion, a shaft on which said gear is fixed, arms fixed to said shaft, and thrust arms connecting said first arms and the extensible apron.

2. In an automobile, in combination, a fender having a hinged back portion and an extensible apron portion, and means acting automatically to extend said apron portion upon backward swinging movement of said back portion, said means including a rack, a gear adapted to be caused to roll on said rack upon rearward movement of said back portion, a shaft on which said gear is fixed, arms fixed to said shaft, and thrust arms connecting said first arms and the extensible apron, said extensible apron comprising a roller shaft carried by the said back portion, and a series of flexible strips each attached at one end to said roller shaft.

3. In an automobile, in combination, a fender having a hinged back portion and an extensible apron portion, means acting automatically to extend said apron portion upon backward swinging movement of said back portion, a brake shoe adapted to contact with the ground, a cable holding said brake shoe raised, a latch with which said cable is releasably engaged, a detent holding said latch in operative position, said detent having a tailpiece adapted to be operated to release the detent when said back portion of the fender is moved rearwardly.

4. In an automobile, in combination, a fender comprising a back portion and an extensible apron, a hinged element on which said back portion is hingedly mounted in turn, and means carried by said hinged element and adapted to cause said extensible portion to extend, said part comprising a gear engaging a fixed rack.

In testimony whereof I have affixed my signature.

MICHELL RESK.